United States Patent [19]
Carroll, Jr.

[11] Patent Number: 5,501,792
[45] Date of Patent: Mar. 26, 1996

[54] ENERGY AND WATER SAVING LAUNDRY SYSTEM

[75] Inventor: John D. Carroll, Jr., Charlton, Mass.

[73] Assignee: Hydrokinetics, Inc., Auburn, Mass.

[21] Appl. No.: 216,818

[22] Filed: Mar. 23, 1994

[51] Int. Cl.$^6$ ................................... D06F 33/02
[52] U.S. Cl. .......................... 210/141; 68/18 F; 68/207; 68/902; 210/167
[58] Field of Search ................... 210/138, 143, 210/167, 805, 258, 141; 68/12.12, 12.19, 17 R, 18 R, 18 F, 207, 208, 902

[56] References Cited

U.S. PATENT DOCUMENTS

| | | | |
|---|---|---|---|
| 1,180,965 | 6/1931 | Hopkins | 210/483 |
| 2,212,647 | 8/1940 | Nugent | 210/131 |
| 3,147,217 | 9/1964 | Healton | 210/705 |
| 3,249,228 | 5/1966 | Arvanitakis | 210/493.1 |
| 3,295,689 | 1/1967 | Arvanitakis | 210/325 |
| 3,841,116 | 10/1974 | Klein et al. | 68/18 F |
| 3,915,857 | 10/1975 | Olson | 210/104 |
| 4,211,652 | 7/1980 | Thomas | 210/703 |
| 4,441,340 | 4/1984 | Kaplan | 68/18 F |
| 5,097,556 | 3/1992 | Engel et al. | 68/18 F |
| 5,180,489 | 1/1993 | Bourgeois | 210/238 |
| 5,307,650 | 5/1994 | Mertz | 68/902 |
| 5,383,241 | 1/1995 | Krieger | 68/902 |

*Primary Examiner*—Joseph W. Drodge
*Attorney, Agent, or Firm*—Blodgett & Blodgett

[57] ABSTRACT

An energy and water conservation laundry mechanism which includes a plurality of automatic washing machines, a rinse water storage tank, plumbing which connects the storage tank to the each of the washing machines, and electrical controls which are tied into the existing control circuitry of the washing machines for selectively directing the flow of rinse water between the storage tank and the washing machines. The plumbing includes pumps and valves which enables rinse water, as stored in the storage tank, to be delivered to each washing machine at the beginning of a wash cycle and waste water from the wash cycle to be discharged into a conventional sewer line. Rinse water from each washing machine at the end of each rinse cycle, is pumped to the storage tank for reuse for subsequent wash cycles of the machines. The invention also includes a filter for the rinse water which includes a toroidal shape filter element.

9 Claims, 11 Drawing Sheets

ENERGY AND WATER SAVING LAUNDRY SYSTEM

BACKGROUND OF THE INVENTION

The present invention relates to an energy and water conserving water flow system for automatic washing machines which have independent time control means for executing wash and rinse cycles. Each washing machine includes means for introducing water to the machine. Many water and energy conservation systems have been developed for utilization with conventional automatic washing machines.

Prior art laundry systems are closed loop systems which recycle the laundry water continuously. Water which is discharged from the machine is filtered and chemically treated and returned to the washing machines as relatively clean water. Fresh water from a conventional fresh water supply source is added to the system to replace water which is lost, primarily water which remains in the damp fabric after washing. Such systems are desirable in an area where there is an extreme water shortage or the cost of obtaining and treating fresh water is greater than the cost of treating the water. In the majority of cases, the cost of treating the wash water for recycling is greater than the cost of the water and the cost of treating the water. Such a system is not particular desirable in an area where there is no acute or serious water shortage. Treatment systems for recycling wash water are complex and expensive to install, require considerable space and are expensive to operate and maintain. In another prior art laundry system, water which is discharged from each washing machine is selectively diverted to an open waste water trough which leads to a sewer system or to an open recycle trough which leads through a filter to a storage tank. Water is pumped from the storage tank to a hot water tank which supplies hot water to the washing machines. The water in the storage tank is chemically treated. The open troughs represent an unsanitary and aesthetically objectionable condition and are physically limiting since the storage tank must be located below the washing machines. This situation may be an impossible condition for most installations. In a still further prior art laundry system, water which is discharged from each washing machine is pumped to a storage tank complex which enables the storage tank complex to be positioned at the same level as or above the washing machines. The storage tank complex includes a waste water tank and a recycled water tank. Water from the washing machines is selectively diverted into the waste water tank or into the recycled water tank where it is chemically treated. Water from the recycled water tank is pumped to the hot water tank which feeds hot water to the washing machines. Such a system is less complex than prior art laundry systems which completely recycle discharge water from washing machines but is nevertheless relatively complex and space intensive. These and other difficulties experienced with the prior art was water recycling systems have been obviated by the present invention.

It is, therefore, a principal object of the present invention to provide an energy and water conservation laundry system for automatic washing machines which does not require treatment of the water beyond minimal filtering of the water.

Another object of this invention is the provision of an energy and water conservation laundry system for automatic washing machines which can be used with a plurality of conventional automatic washing machines, each washing machine functioning independently of the other washing machines.

A further object of the invention is the provision of an energy and water conservation laundry system for automatic washing machines which is simple in construction, relatively inexpensive to build and operate, easy to install and maintain and capable of a long life of useful service.

A still further object of the invention is the provision of an energy and water conservation laundry system for automatic washing machines which can be easily adapted to an existing laundry installation with a minimum of modifications to the system.

It is another object of the present invention is the provision of an effective and efficient filter apparatus for filtering solids from a liquid which contains solids in suspension.

With these and other objects in view, as will be apparent to those skilled in the art the invention resides in the combination of parts set forth in the specification and covered by the claims appended hereto.

SUMMARY OF THE INVENTION

In general, the present invention consists of a method of saving energy and water in a laundry system employing automatic washing machines, each machine having time control means for executing wash and rinse cycles. At the beginning of a washing cycle for each washing machine, rinse water from a rinse water storage tank is pumped to the washing machine. At the end of a wash cycle, water is discharged from the washing machine into a conventional waste water system. Fresh water from a conventional source of fresh water is introduced into the machine for each rinse cycle. At the end of such rinse cycle, rinse water is pumped from the machine to the rinse water storage tank.

The present invention also consists of an apparatus for carrying out the above method. The apparatus comprises a plurality of automatic washing machines which have fresh water inlet means, rinse water storage means, including a rinse water storage tank and first conduit means, second conduit means connected to the washing machines, pump means discharge means and control means for coordinating the wash and rinse cycles of the machines with the pump means, discharge means and fresh water inlet means.

The present invention further consists of filter apparatus for filtering solids from a liquid which contains solids in suspension. The filter includes a housing which has an annular generally toroidal shaped chamber which contains a generally toroidal shape porous filter element and an inner chamber which an opening into the outer chamber and an opening for receiving the liquid to be filtered. The filter element has an opening to the outer chamber for receiving the liquid to be filtered which flows from the inner chamber to the outer chamber. The housing has an outlet opening to the outer chamber for receiving the filtered liquid which passes through the filter element.

BRIEF DESCRIPTION OF THE DRAWINGS

The character of the invention, however, may be best understood by reference to one of its structural forms, as illustrated by the accompanying drawings, in which.

DETAILED DESCRIPTION OF THE INVENTION

Figure 1:
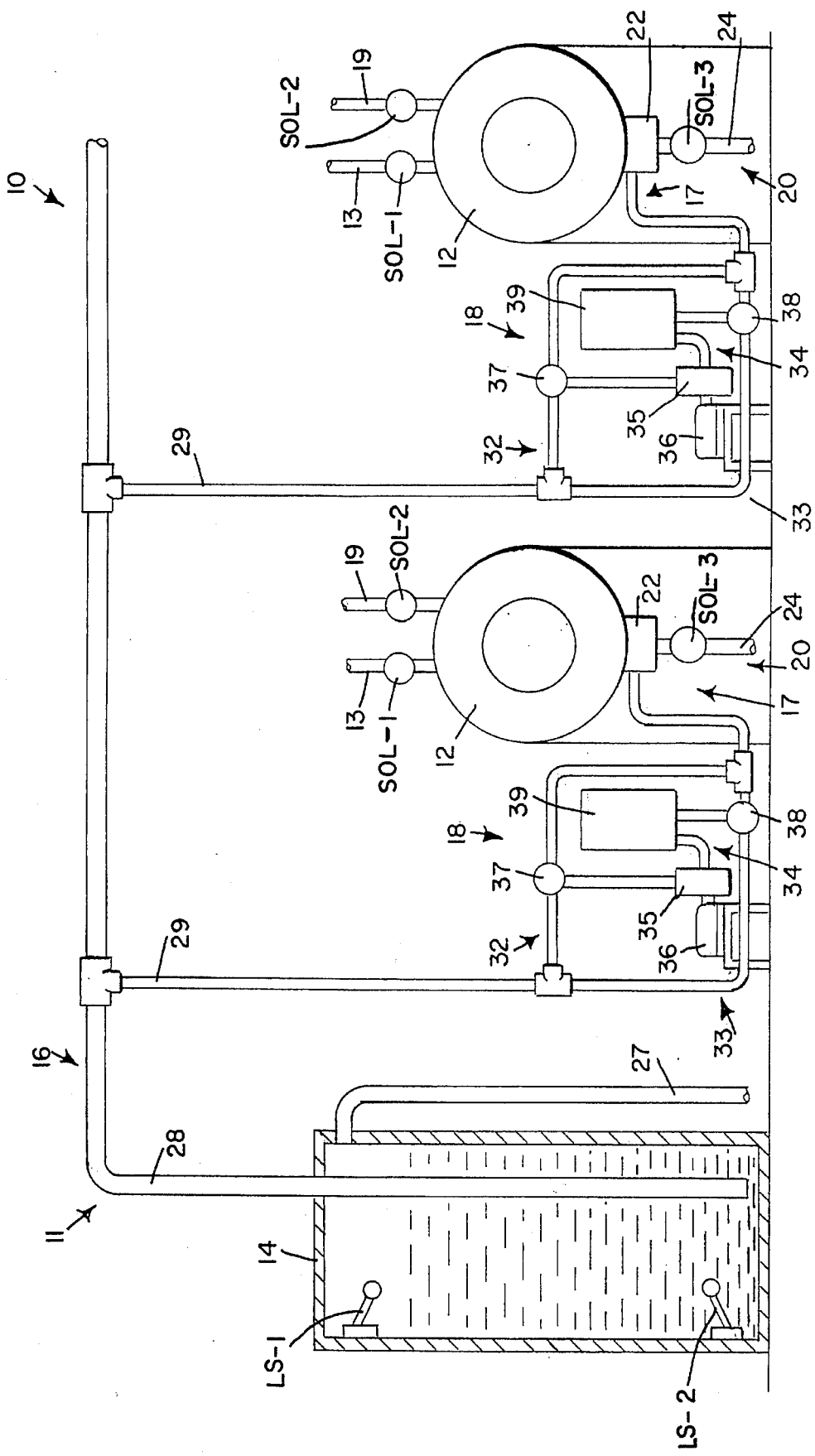
FIG. 1 is a diagrammatic view of a first embodiment of a laundry system embodying the principals of the present invention.
Figure 2:
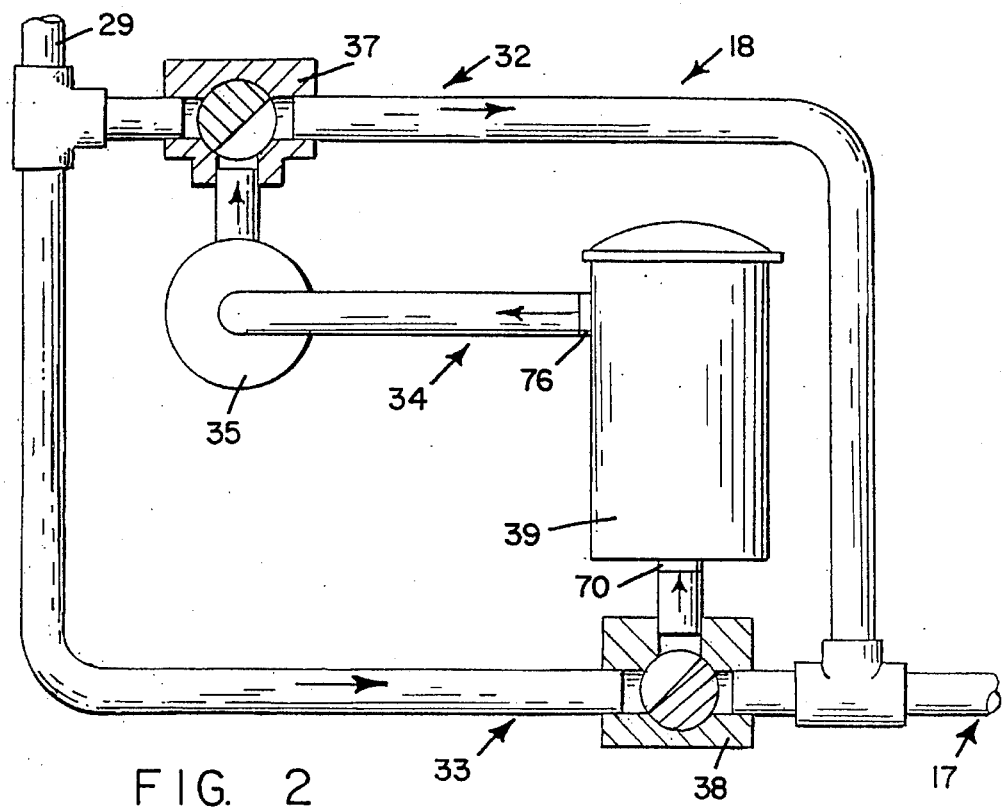
FIG. 2 is a diagrammatic view of a pump and valve assembly which forms part of the washing machine system shown in a first operating mode.
Figure 3:
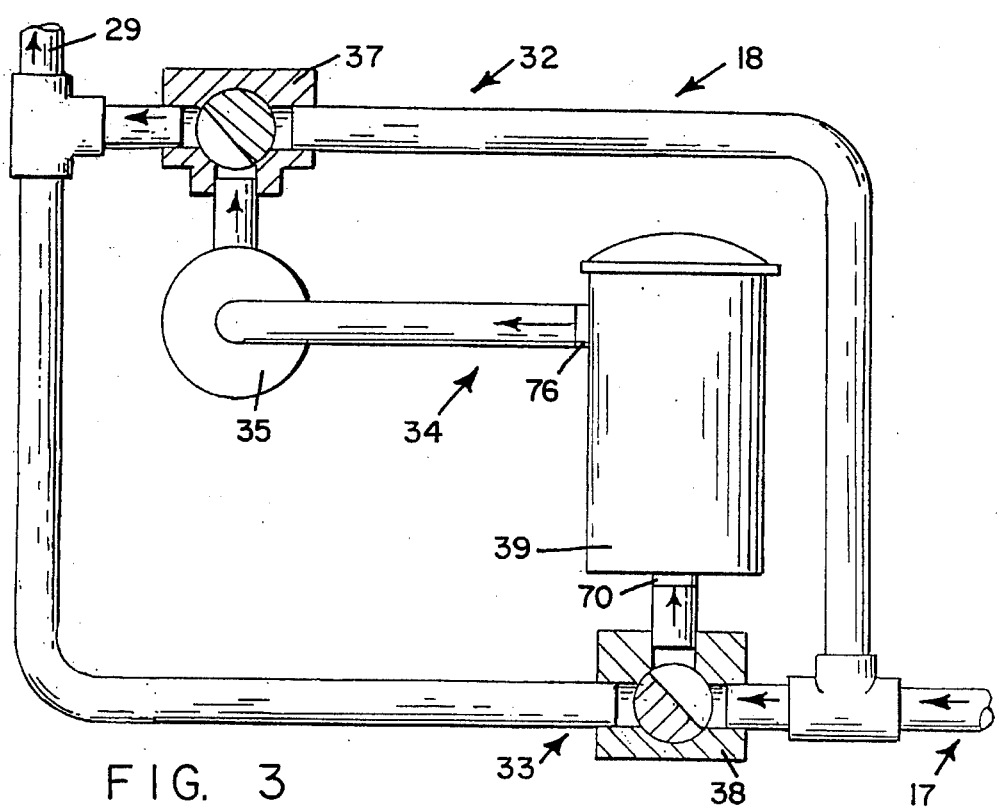
FIG. 3 is a view of the pump and valve assembly of FIG. 2 shown in a second operating mode.

Referring first to FIGS. 1–3, a first simplified embodiment of the present invention is generally indicated by the reference numeral 10 and comprises a rinse water storage means, generally indicated by the reference numeral 11 and a plurality of conventional automatic washes 12. The rinse water storage means includes a rinse water storage tank 14 and first conduit means, generally indicated by the reference numeral 16. Each washing machine 12 is connected to a second conduit means, generally indicated by the reference numeral 17. Each second conduit means is operatively connected to the first conduit means 16 by pump means, generally indicated by the reference numeral 18. The first conduit means 16 includes a main conduit 28 which is connected to the storage tank 14 and a plurality of branch conduits 29, one for each of the washing machines 12. Hot and cold water is selectively supplied to each washing machine 12 from hot and cold water supply pipes 13 and 19, respectively, by means of solenoid valves Sol-1 and Sol-2, respectively. Each washing machine has a manifold 22 for receiving waste water from the machine. Waste water is selectively delivered from the manifold 22 to either the second conduit means 17 or to a discharge pipe 24 by means of a solenoid valve Sol-3. When solenoid valve Sol-3 is closed, waste water from the washing machine 12, will enter the second conduit means 17. When the solenoid valve Sol-3 is opened, waste water from the washing machine 12, will enter the discharge pipe 24 which leads to a conventional sewage system. The water storage tank 14 has a high water level switch LS-1 near the upper end of the tank and a low water level switch LS-2 near the bottom of the tank. An overflow pipe 27 is connected to the upper end of the tank 14.

Each pump means 18 includes a first pipe means, generally indicated by the reference numeral 32, second pipe means, generally indicated by the reference numeral 33 and a third pipe means, generally indicated by the reference numeral 34. The first pipe means 32 is connected to its respective branch conduit 29 and to its respective second conduit means 17. The second pipe means 33 is connected to its respective branch conduit 29 and to its respective second conduit means 17. The third pipe means 34 is operatively connected to the first pipe means 32 and to the second pipe means 33. A pump 35 is operatively connected to the third pipe means for pumping rinse water from the second pipe means 33 to the first pipe means 32. A first three way valve 37 is operatively connected to the first and third pipe means 32 and 34, respectively. A second three way valve 38 is operatively connected to the second and third pipe means 33 and 34, respectively. Valve 37 has a first position wherein rinse water flows from the water storage tank 14 to the third pipe means 34 and a second position wherein rinse water flows from the washing machine 12 to the third pipe means. The second valve 38 has a first position, wherein rinse water flows from the third pipe means 34 toward the washing machine 12 and a second position, wherein rinse water from the third pipe means 34 flows toward the water storage tank 14. When both of the valves 37 and 38 are in their first positions, rinse water is pumped from the storage tank 14 to the washing machine. When both of the valves 37 and 38 are in their second positions, rinse water is pumped from the washing machine to the water storage tank 14. A filter 39 is located in the third pipe means 34 for filtering particulate material which flows from the second valve 38 to the first valve 37.

Modified Laundry System

Figure 4:
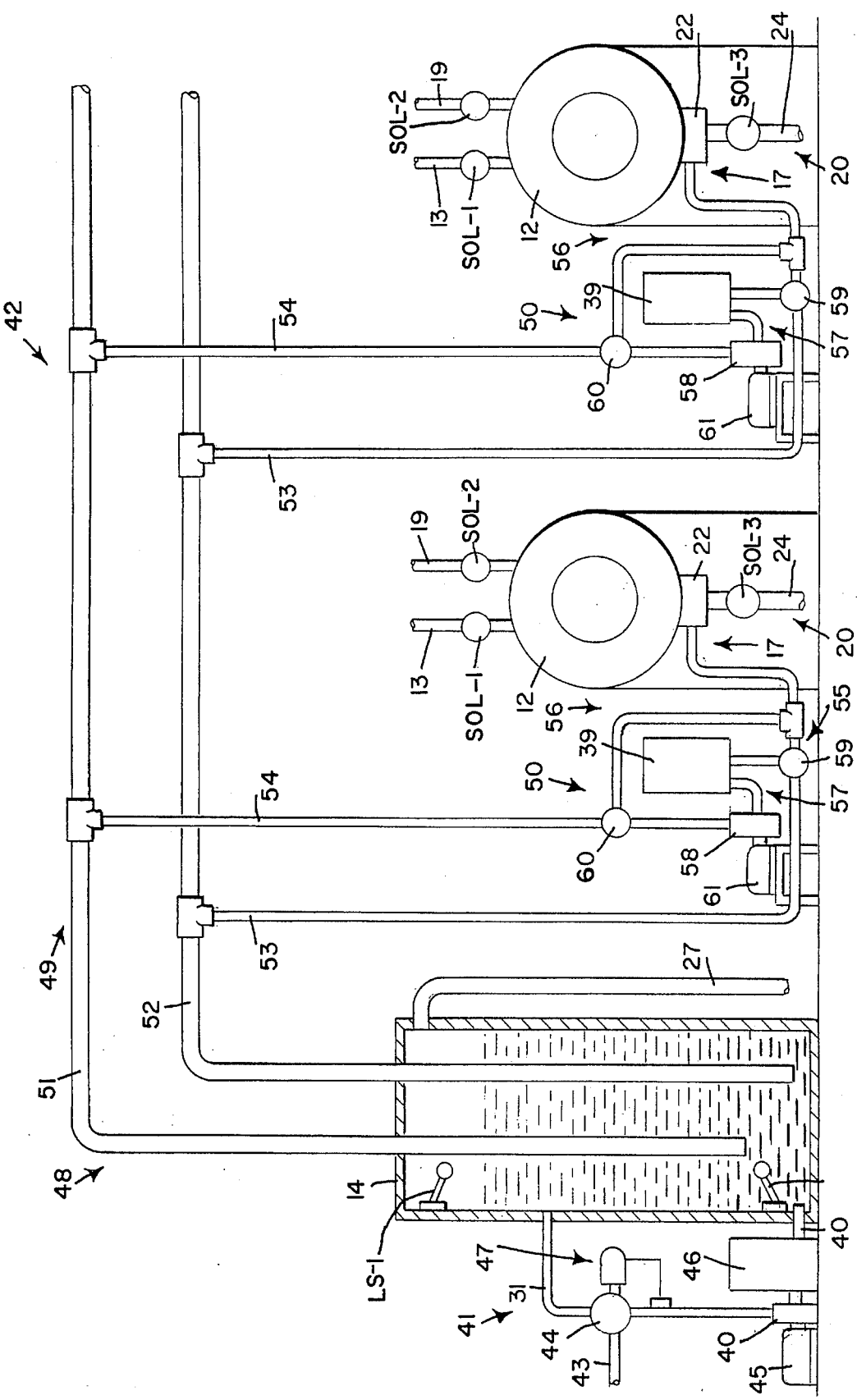
FIG. 4 is a diagrammatic view of a second embodiment of a washing machine system embodying the principals of the present invention.
Figure 5:
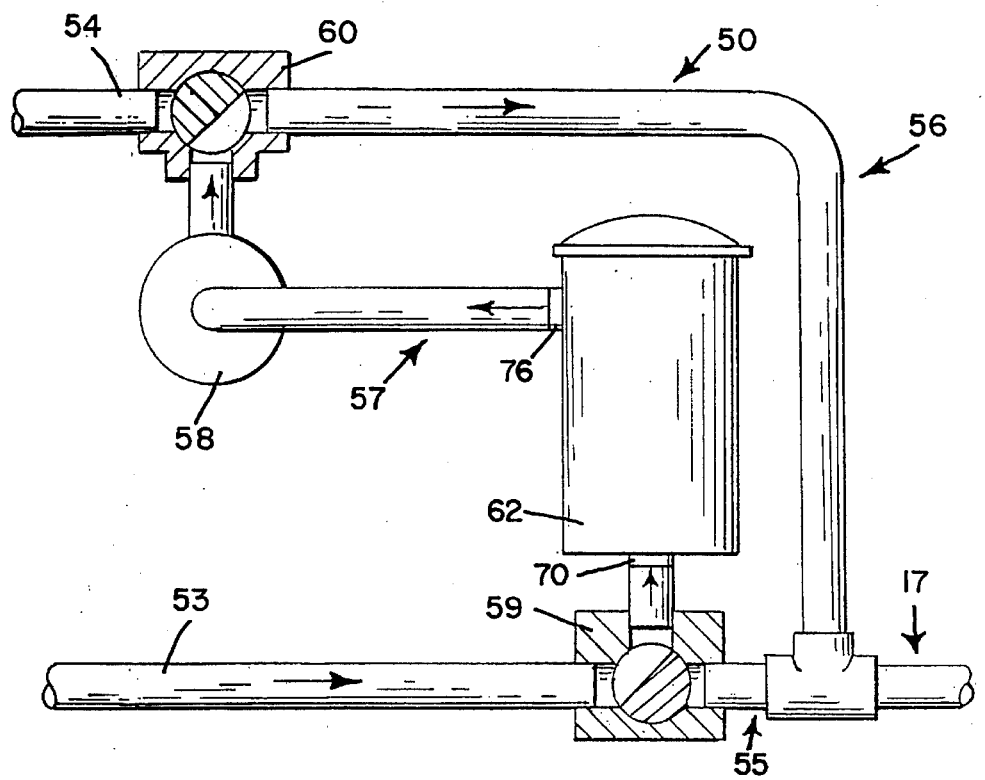
FIG. 5 is a diagrammatic of a pump and valve assembly which forms part of the washing machine system of FIG. 4 shown in a first operating mode.
Figure 6:
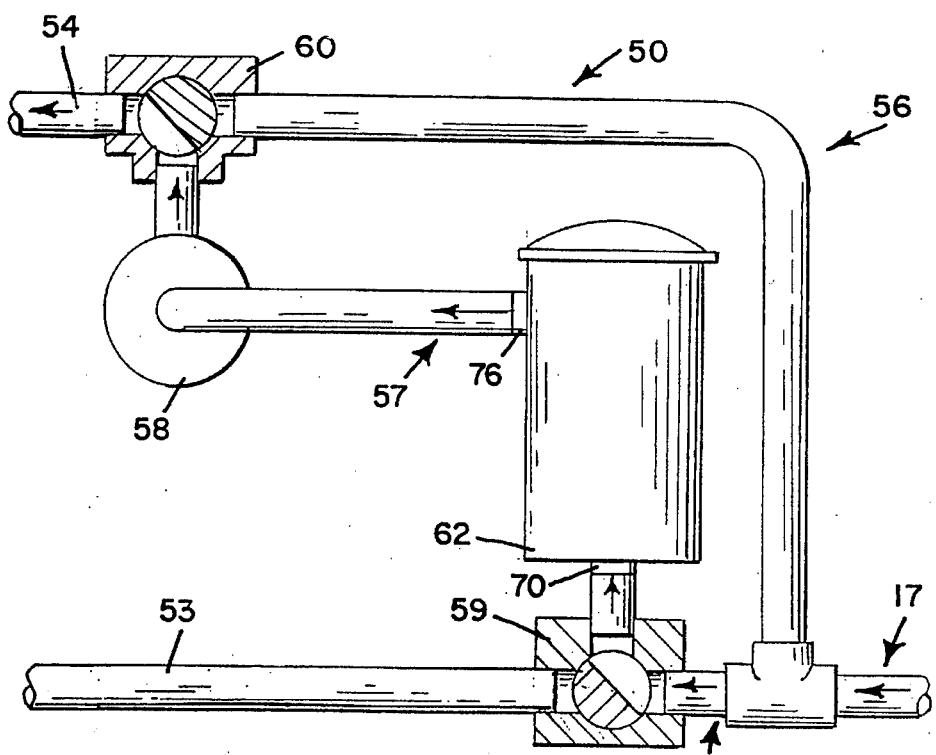
FIG. 6 is a diagrammatic view of a pump and valve assembly of FIG. 5 shown in a second operating mode.

Referring to FIGS. 4–6, them is illustrated a modified laundry system embodying the principals of the present invention which is generally indicated by the reference numeral 42. Laundry system 42 is similar to the system 10 which is illustrated in FIGS. 1–3 in that it includes the water storage tank 14 and conventional automatic washing machine 12, including valves Sol-1 and Sol-2 for selectively supplying fresh water to the washing machines 12 and valves Sol-3 for selectively discharging waste water to the discharge pipe 24 or to the second conduit means 17. The rinse water storage tank 14 includes the upper water level sensing switch LS-I, a lower water level sensing switch LS-2, and the overflow pipe 27. The storage tank 14 is maintained at a predetermined temperature by heating means, generally indicated by the reference numeral 41 which includes a steam mixing valve 44, a pump 40 which is driven by a motor 45, and thermostatic control means, generally indicated by the reference numeral 47. Water from the storage tank 14 is pumped by the pump 14 from a pipe 40 which is connected to the lower part of the tank through a filter 46 to the steam mixing valve 44 which mixes the water with steam from the steam line 43 and then discharges the water back into the storage tank 14 through a pipe 31 which is connected to the upper portion of the storage tank.

The washing machine system 42 includes rinse water storage means, generally indicated by the reference numeral 48 which includes the rinse water storage tank 14 and first conduit means 49, the second conduit means 17 and pump means, generally indicated by the reference numeral 50 for operatively connecting the first conduit means 49 to the second conduit means 17.

The first conduit means 49 includes a first main conduit 51 and a second main conduit 52. The first main conduit 51 is connected to the rinse water storage tank 14 and to a plurality of first branch conduits 53, one for each washing machine 12. The second main conduit 52 is connected to the rinse water storage tank 14 and to a plurality of second branch conduits 54, one for each washing machine 12. Each pair of first and second branch conduits 53 and 54 respectively, is connected to the second conduit means 17 of its respective washing machine 12 through the pump means 50.

Pump means 50 includes a first pipe means, generally indicated by the reference numeral 55, second pipe means, generally indicated by the reference numeral 56, and third pipe means, generally indicated by the reference numeral 57. The first pipe means 55 is operatively connected to the first branch conduit 53 and to the second conduit means 17. The second pipe means 56 is operatively connected to the second branch conduit 54 and to the second conduit means 17. The third pipe means 57 is operatively connected to the first pipe means 55 and to the second pipe means 56. A pump 58 which is driven by a motor 60 is operatively connected to the third pipe means 57 for pumping rinse water from the first pipe means 55 to the second pipe means 56 through a filter 62 which is identical to the filter 39 of the washing machine system 10. A first three way valve 59 is operatively connected to the first and third pipe means 55 and 57, respectively. A second three way valve 60 is operatively connected to the second and third pipe means 56 and 57, respectively. The first three way valve 59 has a first operative position, as shown in FIG. 5, wherein rinse water flows from the water storage tank and first branch conduit 53 to the third pipe means 57 and a second operative position, as shown in FIG. 6, wherein rinse water flows from the washing machine 12 and second conduit means 17 to the third pipe means 57. The second valve 60 has a first operative position, as shown in FIG. 5, wherein rinse water flows from third pipe means 57 toward the washing machine 12 and a second operative position, as shown in FIG. 6, wherein rinse water from the third pipe means 57 flows toward the water storage tank 14. When both of the first and second valves 59 and 60, respectively, are in their first positions, as shown in FIG. 5, water is pumped from the water storage tank 14 by the first branch conduit 53 through the washing machine by the second pipe means 56. When the valves 59 and 60 are in their second operative positions, as shown in FIG. 6, rinse water is pumped from the washing machine 12 via the first pipe means 55 to the water storage tank 14 via the second branch conduit 54.

Filter

Figure 7:
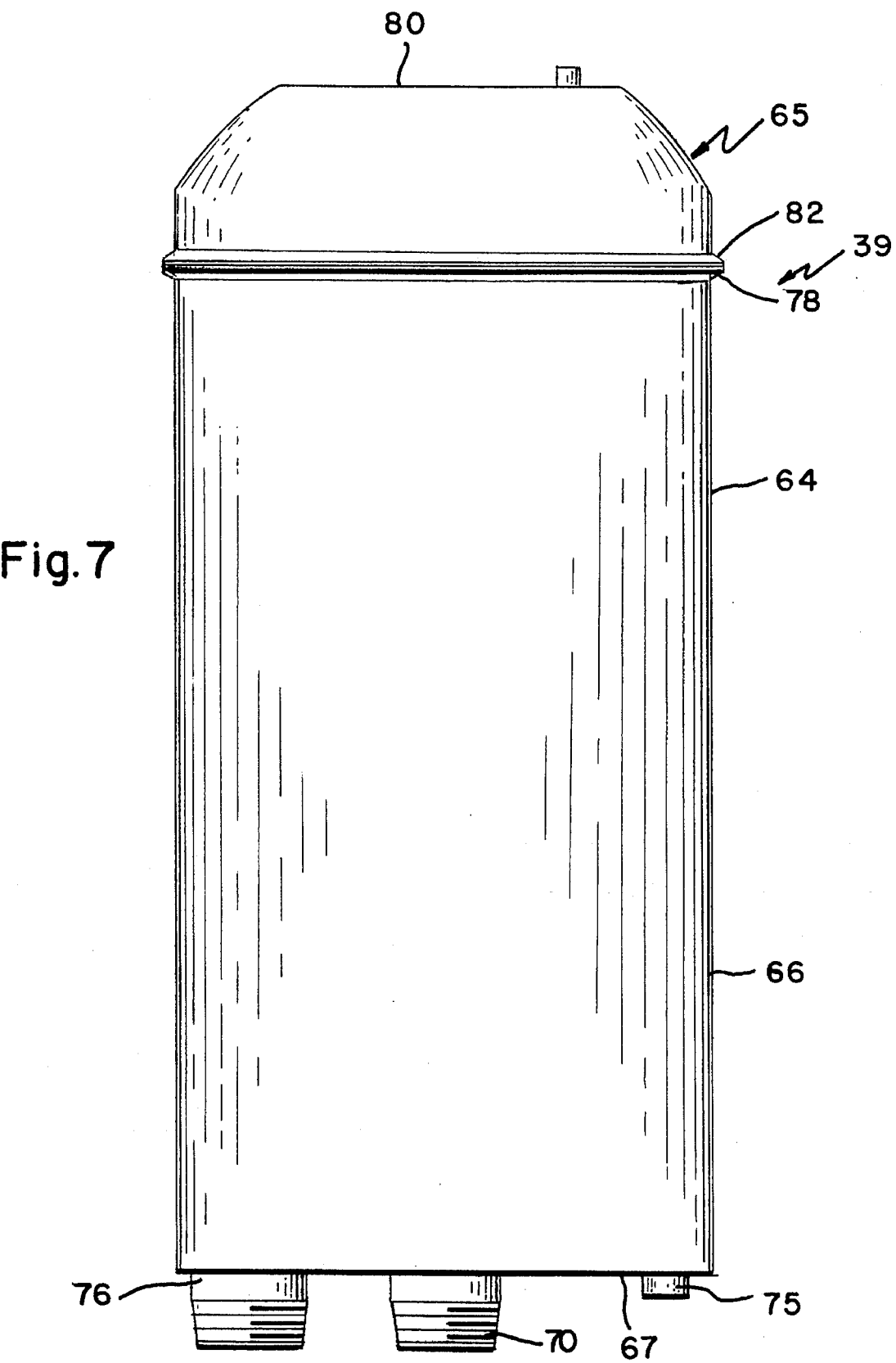
FIG. 7 is a front elevational view of a filter which forms part of the washing machine of the present invention.
Figure 8:
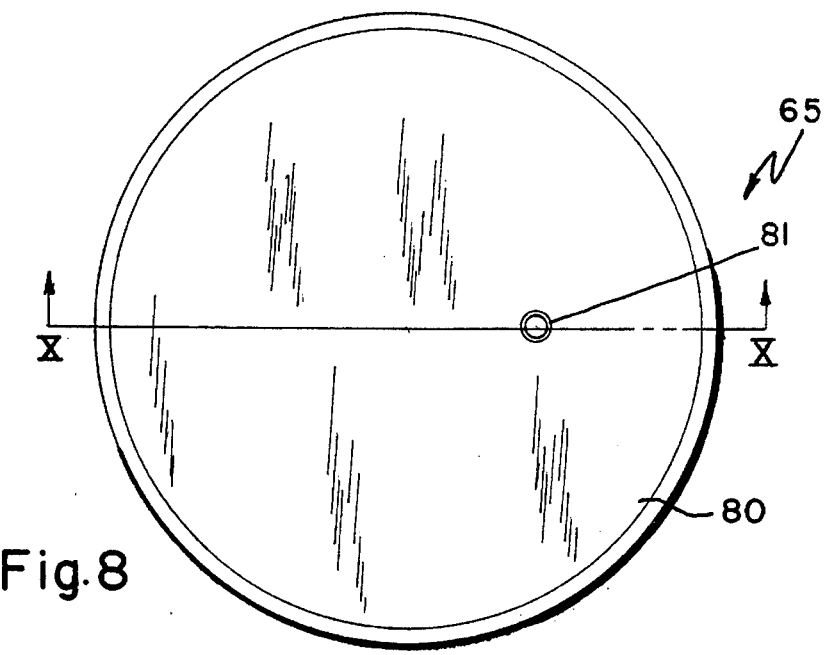
FIG. 8 is a top plan view of the filter.
Figure 9:
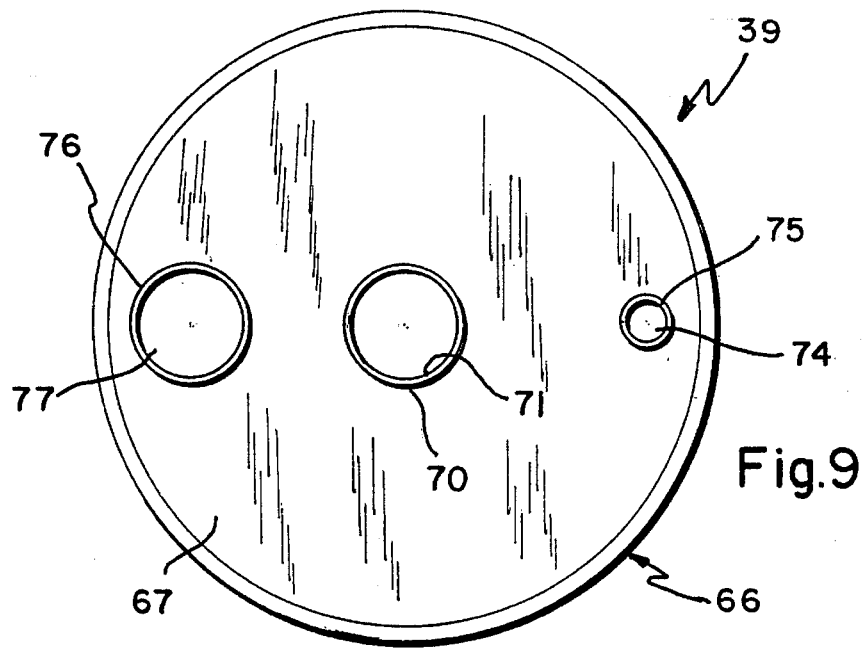
FIG. 9 is a bottom plan view of the filter.
Figure 10:
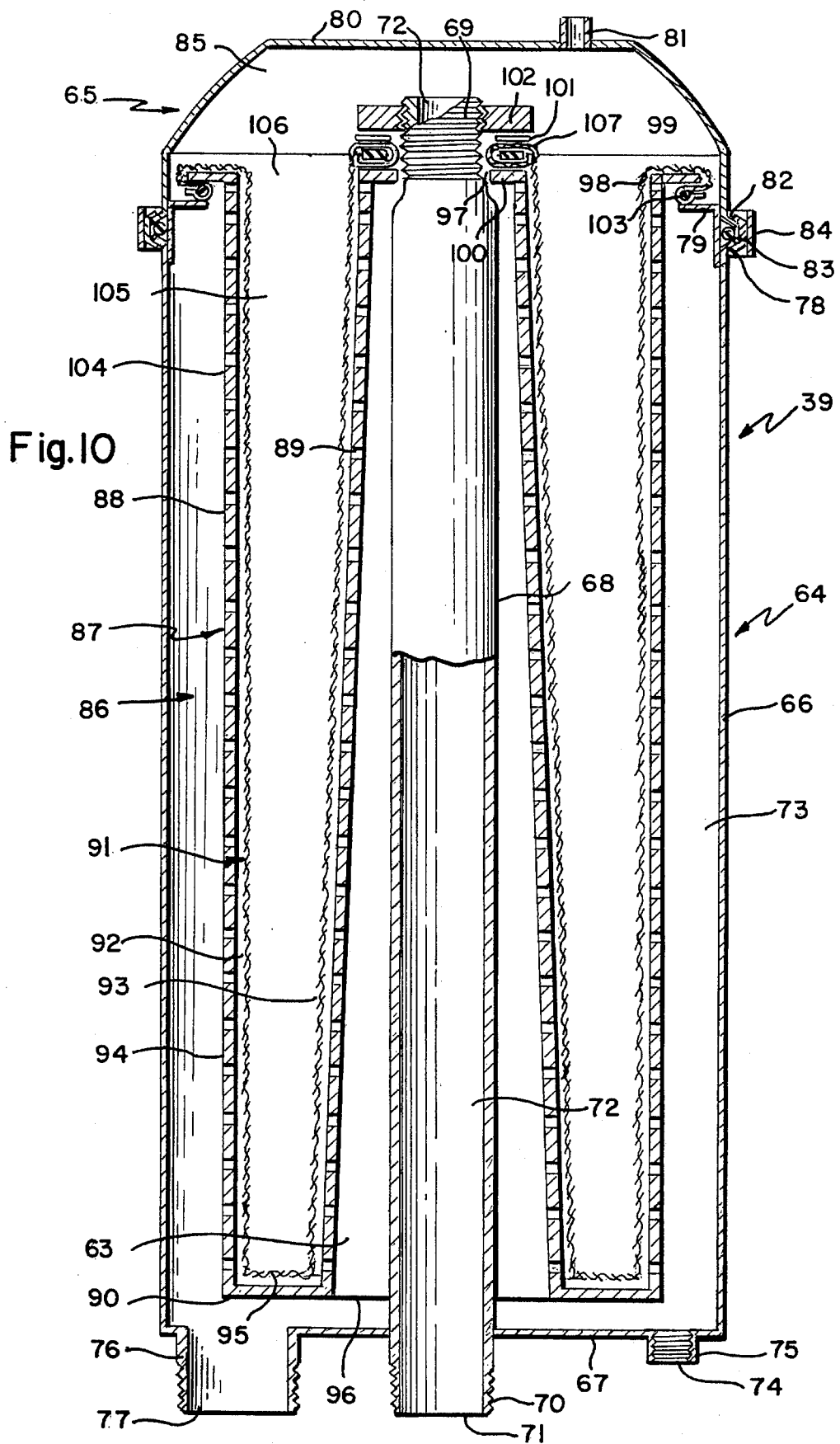
FIG. 10 is a vertical cross-sectional view of the filter taken along the line X—X of FIG. 8 and looking in the direction of the arrows.

The details of the filter 39 are illustrated in FIGS. 7–11. Referring first to FIGS. 7–9, the filter 39 includes an elongated cylindrical housing, generally indicated by the reference numeral 64 and dome-like top cover, generally indicated by the reference numeral 65. The housing 64 has a cylindrical outer wall 66, a bottom wall 67, and an open top which is closed by the cover 65. The cover 65 has a top wall 80 which contains a vent 81. The lower end of the cover 65 has an annular outer flange 82. The upper open end of the outer wall 66 has an annular outer flange 78 which is vertically aligned with the annular flange 82 of the cover. Referring also to FIG. 10, a cylindrical center tube 68 extends from an upper threaded end 69 which is located above the open end of the housing 64 to a lower threaded end 70 which extends through the bottom wall 67. The top end 69 has a top opening 72 and the bottom end 70 has a bottom opening 71. The cylindrical tube 68 has a cylindrical bore or inner chamber 72 which extends from the top opening 72 to the bottom opening 71. The tube 68 is fixed to the bottom wall 67 of the housing 66. The area between the tube 68 and the wall 66 of the housing defines an annular outer chamber 73. A drain nipple 75 extends from the bottom wall 67 and has an opening 74 which leads into the chamber 73. The drain nipple 75 has interior threads for receiving a drain plug, not shown. A larger nipple 76 also extends from the bottom wall 67 and has an opening 77 which leads into the chamber 73. The nipple 76 is operatively connected to the pump 35 by the third pipe means 34. The end 70 of the tube 68 is operatively connected to the valve 38 by the third pipe means 34. Although the nipple 76 is shown in FIG. 10 as extending from the bottom wall 67, it can also extend from the side wall 66 of the housing as shown in FIG. 3.

The cover 65 is coupled to the housing 64 by inserting an O ring 83 between the flanges 82 and 78 of the cover and housing, respectively. A U-shaped coupling 84 is applied to the flanges 82 and 78 which effectively squeezes the flanges 82 and 78 toward each other against the O ring 83 to form a seal between the housing and the cover. The threaded upper end 69 of the tube 68 extends into an end chamber 85 which is formed by the cover 65.

Figure 11:
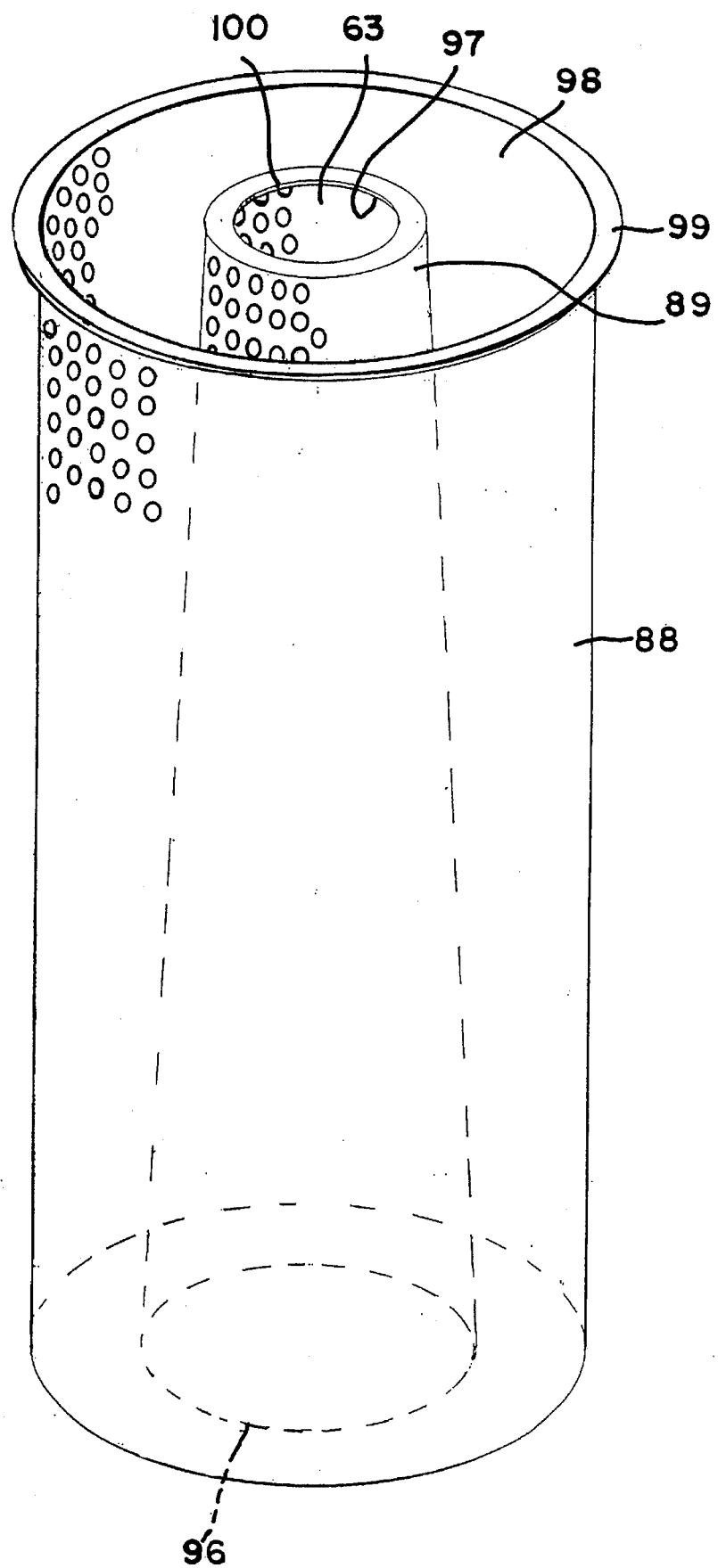
FIG. 11 is a perspective view of a filter basket which forms part of a filter element.

Referring specifically to the FIGS. 10 and 11, the outer chamber 73 contains the filter element assembly which is generally indicated by the reference numeral 86. Assembly 86 includes a toroidal shaped perforated filter basket, generally indicated by the reference numeral 87 which contains a toroidal shape cloth filter bag, generally indicated by the reference numeral 91. The filter bag 91 is preferably made of 50 mesh nylon cloth. The filter basket 87 has an annular outer wall 88, a frusto conical annular inner wall 89, and an annular bottom wall 90. Walls 88 and 89 define, therebetween, an annular chamber 104 which has an annular top opening 98. The inner wall 89 is annular and contains a bore 96' which extends from a lower opening 63 to an upper opening 97. The filter bag 91 is located in the chamber 104 of the basket 87. The filter bag 91 has an annular outer wall 92, an annular inner wall 93, and an annular bottom wall 95. The walls 92, 93, and 95 define an annular chamber 105 which has a top opening 106. The assembly 86 is removably mounted within the chamber 73 of the housing prior to application of the cover 65. The upper end of the outer wall 92 of the filter bag has an annular outer end which is formed into a hem which encloses an elastomeric O ring 103. The upper end of the inner wall 93 of the filter bag has an annular inner end which is formed into a hem which encloses an elastomeric washer 107. The filter basket 87 has an annular outer flange 99 at the top of the outer wall 88 and an annular inner flange 100 at the top of the inner wall 89. The inner flange 100 defines the upper opening 97. An annular upper opening 98 is defined between the inner flange 100, and the outer flange 99. The filter assembly 86 is applied to the housing by placing the hemmed 0 ting 103 between the flange 79 of the housing and the outer flange 99 of the basket and placing the hemmed rubber washer 107 on the inner flange 100 of the filter basket. A flat-ring 101 is placed on top of the hemmed washer 107 and a nut 102 is threaded onto the upper end 69 of the tube 68, thereby forcing the flange 99 toward the flange 79 and, simultaneously, clamping the washer 107 between the flange 100 and the flat ring 101. As the rubber washer is drawn down by the nut 102, the O ring 103 is clamped between the flange 79 of the housing and the flange 99 of the basket. When the filter assembly 86 is properly positioned, the tube 68 is located within the bore 63, as shown in FIG. 10.

During operation of the filter 39, waste water from the valve 38 enter the tube 68 from the opening 71, passes through the inner chamber 72 and enters the upper end chamber 85 from the opening 72 at the top of the tube. The waste water then enters the chamber 105 of the filter bag 91 and passes through the wall to the bag 91 and the filter basket 87 into the outer chamber 73 of the housing. Thereafter, the filtered water passes from the outer chamber 73 through the opening 77 to the pump 35. The filter 62 of the embodiment which is shown in FIGS. 4–6 is identical to the filter 39 and functions in the same manner for filtering rinse water which flows from the valve 59 to the pump 58.

Modified Filter Element

Figure 12:
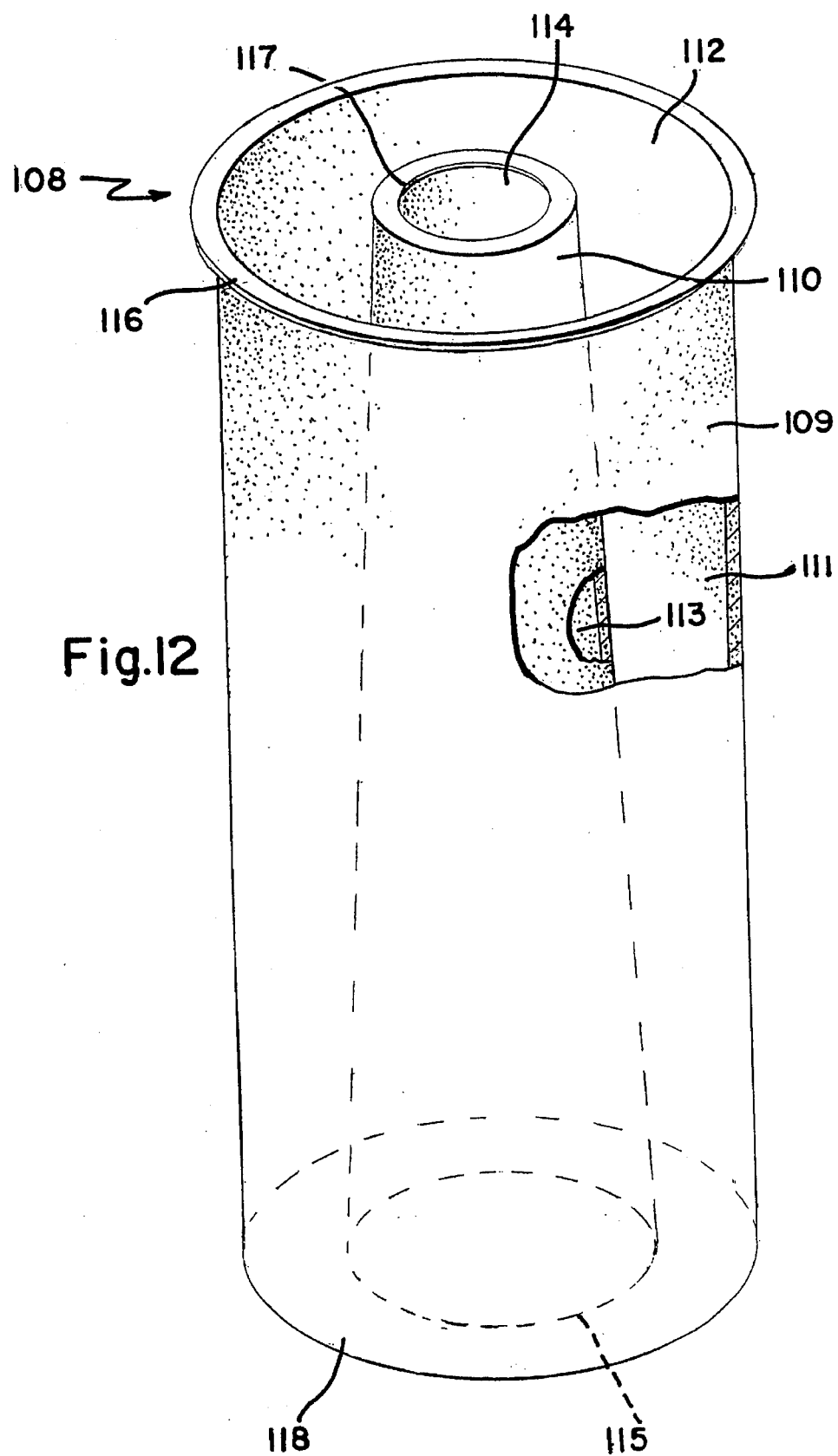
FIG. 12 is a vertical cross-sectional view similar to FIG. 11 showing a modified filter element.

Referring to FIG. 12, there is shown a modified filter element for insertion within the housing 64. The modified filter element consists of a porous filter cartridge, generally indicated by the reference numeral 108. The cartridge 108 has the same configuration as the basket 87. However, the cartridge 108 is made out of a porous filter material for filtering particulates from the rinse water which flows through the walls of the cartridge.

The cartridge 108 has a cylindrical outer wall 109, a frusto conical annular inner wall 110, and an annular bottom wall 118. The space between the inner and outer walls of the cartridge define an annular chamber 111 which has a top opening 112. The space within the inner wall 110 defines a bore 113 which extends from a bottom opening 115 to a top opening 114. An annular outer flange 116 extends outwardly from the outer wall 109 and an annular inner flange 117 extends inwardly from the inner wall 110 and defines the top opening 114. The filter cartridge 108 is positioned within the housing 64 in the same manner as the filter assembly 86. The outer flange 116 is positioned on an O ring which rests on the inner flange 79 of the housing. A rubber washer, such as the washer 107, is placed on the inner flange 117 and the flat ring 101 is placed on the washer 107. When the threaded nut 102 is screwed onto the threaded upper end 69 of the tube 68, the rubber washer and the O ring are compressed to form seals between the inner flange 117 and the tube 68 and between the outer flange 116 and the housing 64. After the filter cartridge 108 has been used for a predetermined amount time, it is replaced by a new filter cartridge by removing the cover 65 and unscrewing the nut 102.

When the filter cartridge 108 is used in the housing 64, the flow of rinse water through the housing is reversed. The nipple 76 is connected to the valve 38 and the end 70 of the tube 68 is connected to the pump 35 by the third pipe means 34. The rinse water to be filtered passes into the outer chamber 73 of the housing from the inlet opening 77 and then passes through the inner and outer walls 110 and 109, respectively, into the outer annular chamber 112 of the cartridge. The filtered waste water then passes through the opening 112 into the upper end chamber 85 and into the top opening 72 of the tube 68. The filtered rinse water then passes through the bore or inner chamber 72 of tube 68 through the opening 71 and to the third pipe means to the pump 35.

Electrical Control Circuitry and Operation of the Washing Machine System

Figure 13:
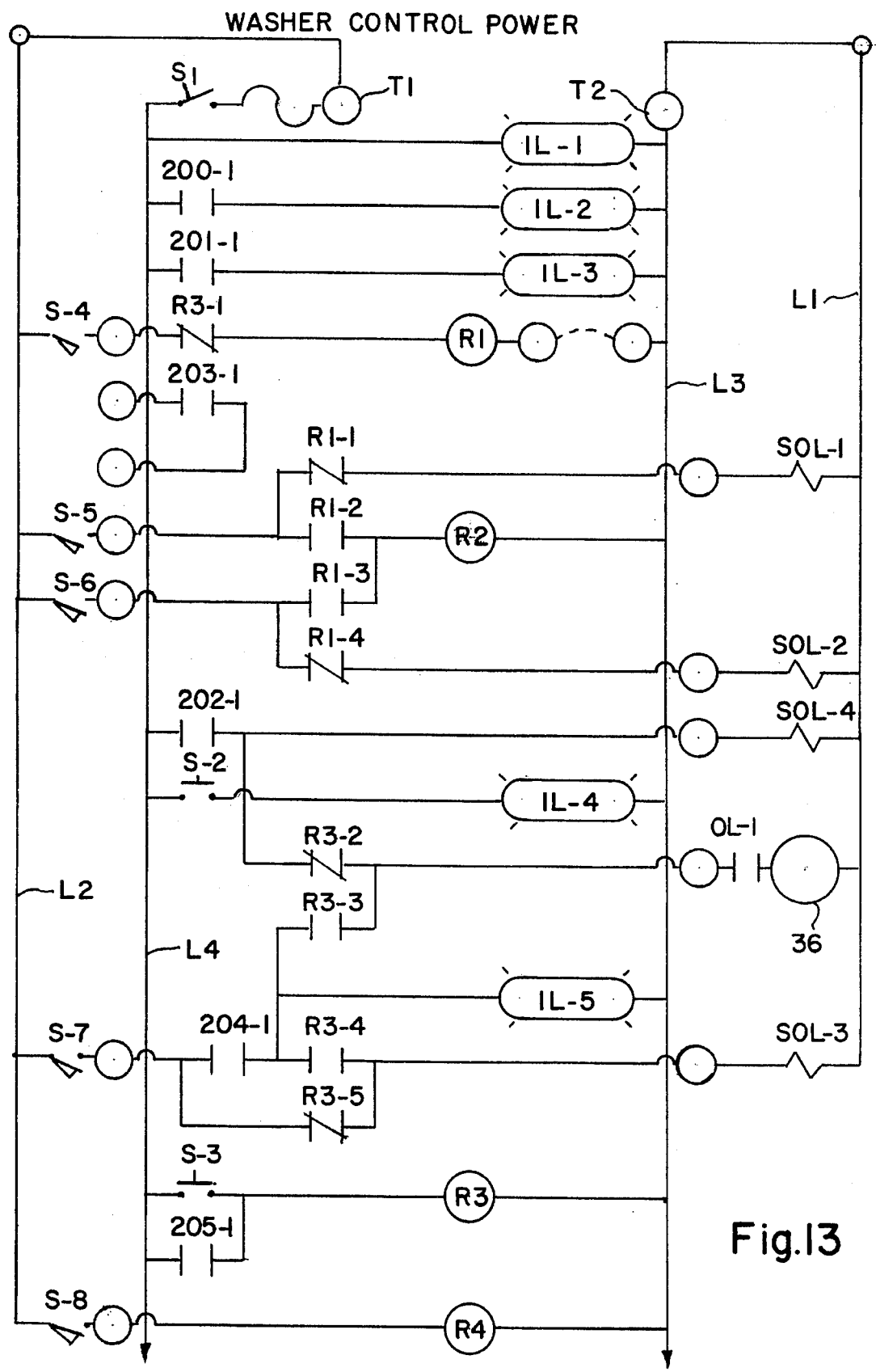
FIG. 13 is a schematic electrical diagram of the control means for the washing system of the present invention.
Figure 14:
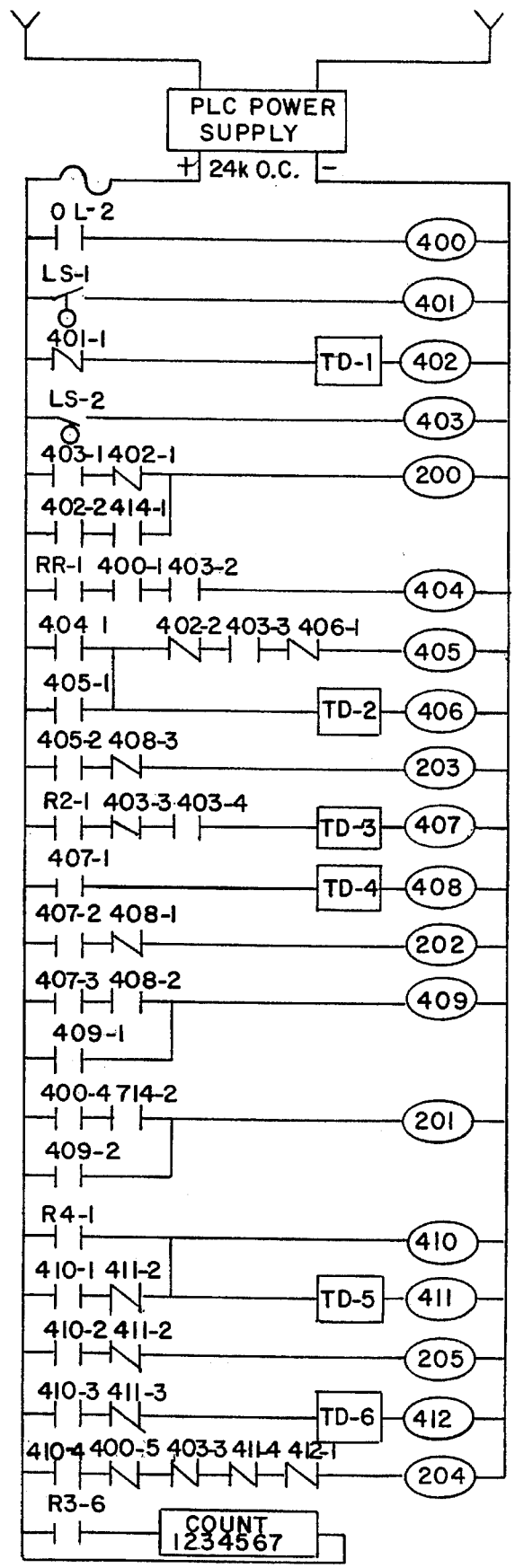
FIG. 14 is a schematic electrical diagram of a programmable logic controller which forms part of the electrical control means of the present invention.

The control circuitry, as shown in FIGS. 13 and 14, is applied by way of example to the system shown in FIGS. 4–6, but is also applicable to the system which is shown in FIGS. 1–3. In general, at the beginning of a wash cycle for any one of the washing machines 12, rinse water which is stored in the tank 14 is pumped by the corresponding pump 58 to the washing machine for each wash cycle. At the end of each wash cycle, the normally open solenoid valve Sol-3 allows the wash water from the washing machine to drain into the pipe 24 and, thereafter, to a conventional sewage system. At the beginning of each rinse cycle the solenoid valves Sol-1 and Sol-2 are energized to open the valves and allow hot and cold water to enter the washing machine from pipes 13 and 19, respectively. At the end of each rinse cycle, the solenoid Sol-3 is closed and rinse water is pumped to the storage tank 14 for reuse with subsequent wash cycles for any of the washing machines 12.

The reuse controller input/output circuit board can accept output from a variety of different washer formula controls. Several programmable holding circuits and numerous input connection terminals allow the input/output board to be configured to accept dedicated reuse in the reuse out outputs and momentary or continuous signal outputs coupled with the formula control's water level and drain controls. The reuse control automatically reverse back to the washer formula control and it's conventional water supply and waste water draining means in the event of power failure within the reuse control or it's limiting devices, pump failure, extend reuse fill times and inadequate or excessive water levels within the reuse or rinse water storage tank 14.

Power from the existing washer formula controller circuit (lines L1 and L2) is connected to terminals T1 and T2 of the reuse controller circuit (lines L3 and LA). All unlabeled circles between lines L1 and L3 and between lines L2 and L4 represent terminals which enable the reuse controller circuit to configure to different washing machine control circuits. A switch S-1, when closed, connects power to the programmable logic controller, manual switches S-2 and S-3 programmable logic controller (PLC) output relay commons and power indicator light IL-1. The PLC power supply produces 24 volt D.C. for all PLC inputs and relays. The D.C. circuit through the reuse water storage tank 14 high level float switch LS-1 is closed provided the water level is below the float energizing relay 401, thereby opening normally closed contacts 401-1. If the tank water level raises the float on LS-1, then relay 401 is de-energized, thereby closing normally closed contact 401-1 starting time delay relay TD-1 (typically 10 seconds). TD-1 times out, thereby energizing relay 402 which closes it's normally open contacts 402-2, thereby sending current through clock timer contacts 714-1 (one second on, one second off) energizing at one second intervals PLC output relay 200. Contacts 200-1 close and open subsequentially flashing tank indicator light IL-2.

D.C. current also passes through the rinse or reuse water tank low level float switch LS-2, provided that the water is above LS-2, thereby energizing PLC relay 403 and causing normally open contacts 403-1 to close completing circuit through normally closed 402-1, this energizes PLC output relay 200 which closes it's normally open contacts 200-1 which energizes indicator light IL-2. The steady illumination of light IL-2 indicates that the water level in the tank 14 is within acceptable limits. If the water level in the tank 14 falls below limit switch LS-2, relay 403 will deenergize, thereby shutting off light IL-2 which indicates that there is insufficient water within the storage tank 14. The normally open contact OL-2 closes if the current to the pump motor 61 exceeds the set limit of the pump motor contractor, thermal overload device energizing relay 400 which closes normally open contacts 400-4 connecting D.C. current to PLC clock timer contacts 714-2 which energizes output relay 201 at one second intervals. Normally open contacts 201-1 then cycle per 201 flashing a pump indicator light IL-3 which signals pump motor overload.

Given that the existing washer formula control is energized and has been programmed with the appropriate output sequences:

When it is necessary to fill the washer with rinse or reuse water, the water formula controller closes its "reuse in" output switch or contact, thereby S-4 energizing reuse control relay R-1 through normally closed contacts R3-1 which closes normally open contacts R1-1 and enabling PLC D.C. circuit through normally closed 400-1 (provided R.P.M. overload is not tripped) and then through closed normally open contacts 403-2 (provided storage tank water level is above LS-2) and energizing relay 404. PLC normally open contacts 404-1 then close and complete the circuit through normally closed contacts 400-2, closed normally open contacts 403-3 and normally closed 406-1 to energize relay 405. Normally open contacts 405-1 close latching circuit to relay 405 and energize time delay relay TD-2 (typically set 100 seconds). Normally open contacts 405-2 now latch closed, thereby energizing output relay 203 which holds circuit energized to R1 via contacts 203-1. Normally closed contacts RI-1 and R1-4 breaking washer formula control circuit to washer hot, Sol-1, and cold, Sol-2. Normally closed contacts R1-2 and R1-3 close connecting washer formula control water output to reuse control relay R2. Normally open contacts R2-1 close, thereby enabling PLC circuit through normally closed contacts 400-3 and 403-4, thereby energizing a five second time delay relay TD-3. Relay TD-3 prevents rapid cycling of pump motor 61; minimizing pump starts and contractor chatter caused by the rise and fall of the water level in the wash wheel as it rotates. When relay TD-3 times out, it energizes relay 407, closing normally open contacts 407-1 starting time delay relay TD-4, closing normally open contacts 407-2 through normally closed contacts 408-1, thereby energizing PLC output relay 202. The normally open contacts of 202-1 close connecting power through normally closed contacts R3-2 to energize the reuse flow reversing solenoid valve, Sol-4, and the contractor of pump motor 61. Sol-4 directs compressed air to enter the three-way valve pneumatic operator pistons which rotate the three-way ball valves 58 and 59 to reverse the flow of the reuse pump 58 to draw water form the storage tank 14 into the washer 12. When the water level is satisfied within the washer, the washer formula control breaks the circuit to the washer control output switches S-5 and S-6, thereby de-energizing relay R2 which de-energizes relay 202 opening contacts 202-1 de-activating pump motor 61 and Sol-4 (which returns the reuse flow reverse valves to the "reuse out" position).

If the water level in the reuse storage tank falls below limit switch LS-2 relay 403 is de-energized opening contacts 403-4 which de-energize relay 405 thereby opening contacts 405-2. Relay 203 is also de-energized, thereby opening contacts 203-1 which de-energizes relay R-1 allowing the power from S-5 and/or S-6 to activate via normally closed contacts RI-1 and R1-4 the washer hot (Sol-1) and cold (SOL-2) water solenoid valves admitting the conventional water supply into the washer to the level allowed by S-5 or S-6.

If relay TD-4 times out (the reuse pump has not filled the washer to level within the TD-4 time set, typically 90 seconds) it energizes relay 408. Normally closed contacts 408-1 open, de-energizing relay 202 and it's contacts and 408-, thereby de-energizing output relay 203 which unlatches relay R1, allowing washer switches S-5 and S-6 to operate Sol-1 and Sol-2. Normally open contacts 408-2 also close energizing relay 409 which is latched by normally open contact 409-1.

Normally open contacts 409-2 energize PLC output relay 201 closing normally open contacts 201-1, enabling power to pump warning light IL-3. The illuminated light IL-3 indicates that the pump filter should be cleaned. Removing power by turning the washer control or the reuse control off will reset relay 409 to the off position.

The washer formula control switch S-7 opens and closes the washer drain valve via drain solenoid valve Sol-3. While S-7 is closed, thus energizing Sol-3 and holding the drain valve closed. The washer formula control closes the "reuse out" switch or contact S-8 when saving water for reuse is desired. S-8 energizes reuse control relay R4 which closes PLC input contacts R4-1 activating relay 410. The normally open contacts 410-1 close and latch circuit through normally closed contacts 411-1 holding relay 410 and starting time delay relay TD-5. Normally open contacts 410-2 close, thereby completing a circuit through 411-2 and energizing output relay 205. Contacts 205-1 close, energizing relay R3. Normally open contacts 410-3 close, completing circuit through normally close 411-3 and starting time delay TD-6. Contacts 410-4 also close, energizing output relay 204 through normally closed contacts 400-5 (provided pump motor thermal overload is not tripped), 402-3, 411-4 and 412-1. Normally open contacts 204-1 close, connecting power from switch S-8 to; solenoid Sol-3 via contacts R3-4, maintaining closed drain valve, this enables the pump motor 61 via R3-3 and energizes reuse out signal light I1-5. Normally closed contacts R3-2 open, preventing activation of "reuse in" circuits. Normally open contacts R3-6 also close, initiating the reuse counter to register a count of one for each cycle that R3 is energized. When delay relay TD-6 times out (typically 60 seconds) relay 412 is energized, thereby opening normally closed contacts 412-1 and turning relay 204 off which opens contacts 204-1 which disconnects power from to the pump motor 61 (stopping pump) and Sol-3, allowing the washer drain valve Sol-3 to open and dump any remaining water in the wash wheel into the pipe 24 to the existing sewer. Time delay relay TD-5 times out (typically TD-6 plus 10 seconds) energizing relay 411 and opening normally closed contacts 411-1; unlatching 410, 411-2; de-activating 205 which releases R3 closing R3-5 and, thereby returning control of solenoid Sol-3 to the washer formula control.

If the water level in the storage tank 14 exceeds limit switch LS-1, thereby braking the circuit to relay 401, the normally closed contact 410-1 closes and causes time delay relay TD-1, et for 10 seconds, to time out (this allows the storage tank 14 to overflow and flush any floating debris into the sewer) and activate relay 402. Normally closed contacts 402-3 open de-activating output relay 204 and causing normally open contacts 204-1 to open which removes power to the pump motor and Sol-3 solenoid and allowing the wash water to drain into the pipe 24 and to the sewer.

The "reuse in" and "reuse out" functions can be initiated independently of the washer formula control by depressing switch S-2 (reuse in) or switch S-2 (reuse out) provided that the reuse controller is powered and the level of the water in the reuse storage tank is within it's limits.

The invention having been thus described, what is claimed as new and desired to secure by Letters Patent is:

1. An energy and water conservation laundry mechanism comprising:

(a) a plurality of automatic washing machines, each of said machines having independent time control means for executing at least one wash cycle and at least one rinse cycle, each of said at least one wash cycle and said at least one rinse cycle including introduction of water to the respective machine and discharge of water from the respective machine, each of said washing machines having a fresh water supply inlet mechanism for selectively connecting the washing machine to a source of fresh water;

(b) rinse water storage means which includes a water storage tank and first conduit means which is operatively connected to said water storage tank;

(c) second conduit means which is operatively connected to each of said washing machines;

(d) pump means including means for operatively connecting said rinse water storage means to said second conduit means for selectively pumping rinse water from each of said washing machines through a respective one-way pump to said rinse water storage means and for pumping rinse water, via said respective pump, from said rinse water storage means through said second conduit means to each of said washing machines;

(e) discharge means which is operatively connected to each of said washing machines for selectively discharging water from the at least one rinse cycle of each of said washing machines into said second conduit means and for selectively discharging water from the at least one wash cycle of each of said washing machines into a waste water system; and (f) control means for coordinating the at least one wash and at least one rinse cycle of each of said washing machines with said pump means, said discharge means and said fresh water supply inlet mechanism so that for each of said washing machines, rinse water is pumped into the washing machine from said rinse water storage means for the at least one wash cycle, water from the at least one wash cycle is discharged into a waste water system, fresh water from the fresh water supply inlet mechanism is introduced into the washing machine for the at least one rinse cycle, and water is discharged from the washing machine at the end of the at least one rinse cycle and pumped to said rinse water storage means.

2. An energy and water conservation laundry mechanism as recited in claim 1, wherein said first conduit means comprises:

(a) a main conduit which is operatively connected to said water storage tank; and (b) a branch conduit for each of said washing machines, each of said branch conduits being connected to the main conduit and to said pump means.

3. An energy and water conservation laundry mechanism as recited in claim 1, wherein said second conduit means comprises a second conduit for each respective washing machine which is operatively connected to the washing machine and, wherein said pump means comprises a pump and valve assembly for each of said washing machines for selectively pumping rinse water from the respective washing machine through its respective second conduit to said rinse water storage means and for pumping rinse water from said rinse water storage means through its respective second conduit to the respective washing machine.

4. An energy and water conservation laundry mechanism comprising:

(a) a plurality of automatic washing machines, each of said machines having independent time control means for executing at least one wash cycle and at least one rinse cycle, each of said at least one wash cycle and said at least one rinse cycle including introduction of water to the respective machine and discharge of water from the respective machine, each of said washing machines having a fresh water supply inlet mechanism for selectively connecting the washing machine to a source of fresh water;

(b) rinse water storage means which includes a water storage tank and first conduit means which is operatively connected to said water storage tank;

(c) second conduit means which is operatively connected to each of said washing machines;

(d) pump means including means for operatively connecting said rinse water storage means to said second conduit means for selectively pumping rinse water from each of said washing machines to said rinse water storage means and for pumping rinse water from said rinse water storage means to each of said washing machines, said pump means comprising a pump and valve assembly for each of said washing machines, each of said pump and valve assemblies comprising:

(1) a first pipe means which is connected to said rinse water storage means and to said second conduit means;

(2) a second pipe means which is connected to said rinse water storage means and said second conduit means;

(3) a third pipe means which is connected to said first pipe means and to said second pipe means;

(4) a pump which is operatively connected to said third pipe means for pumping rinse water from said second pipe means to said first pipe means;

(5) a first valve which is operatively connected to said first and third pipe means, said first valve having a first position wherein rinse water flows from said third pipe means toward the respective washing machine, said first valve having a second position wherein rinse water flows from said third pipe means toward said rinse water storage means; and (6) a second valve which is operatively connected to said second and third pipe means, said second valve having a first position wherein rinse water flows from said rinse water storage means toward said third pipe means, said second valve having a second position wherein rinse water flows from the respective washing machine toward said third pipe means, whereby when both of said first and second valves are in their first positions, water is pumped from said rinse water storage means to the respective washing machine and when both of said first and second valves are in their second positions, rinse water is pumped from the respective washing machine to said rinse water storage means;

(e) discharge means which is operatively connected to each of said washing machines for selectively discharging water from the at least one rinse cycle of each of said washing machines into said second conduit means and for selectively discharging water from the at least one wash cycle of each of said washing machines into a waste water system; and (f) control means for coordinating the at least one wash and at least one rinse cycle of each of said washing machines with said pump means, said discharge means and said fresh water supply inlet mechanism so that for each of said washing machines, rinse water is pumped into the washing machine from said rinse water storage means for the at least one wash cycle, water from the at least one wash cycle is discharged into a waste water system, fresh water from the fresh water supply inlet mechanism is introduced into the washing machine for the at least one rinse cycle, and water is discharged from the washing machine at the end of the at least one rinse cycle and pumped to said rinse water storage means.

5. An energy and water conservation laundry mechanism as recited in claim 4, wherein each of said first and second valves is a three way valve.

6. An energy and water conservation laundry system as recited in claim 4, further comprising, for each of said washing machines, a filter which is operatively connected to said third pipe means so that rinse water which is pumped toward and away from the washing machine flows through said filter.

7. An energy and water conservation laundry mechanism comprising:

(a) a plurality of automatic washing machines, each of said machines having independent time control means for executing at least one wash cycle and at least one rinse cycle, each of said at least one wash cycle and said at least one rinse cycle including introduction of water to the respective machine and discharge of water from the respective machine, each of said wash machines having a fresh water supply inlet mechanism for selectively connecting the washing machine to a source of fresh water;

(b) second conduit means which is operatively connected to each of said washing machines;

(c) rinse water storage means which includes a water storage tank and first conduit means which is operatively connected to said water storage tank, said first conduit means comprising:
  (1) a first main conduit which is connected to said water storage tank;
  (2) a second main conduit which is connected to said water storage tank;
  (3) a first branch conduit for each of said washing machines, each of said first branch conduits being connected to said first main conduit and to said pump means so that when rinse water is pumped from said second conduit means to said rinse water storage means, the rinse water flows through said first main conduit and said first branch conduits; and
  (4) a second branch conduit for each of said washing machines, each of said second branch conduits being connected to said second main conduit and to said pump means so that when rinse water is pumped from said rinse water storage means to said second conduit means, the rinse water flows through said second main conduit and through said second branch conduits;

(d) pump means including means for operatively connecting said rinse water storage means to said second conduit means for selectively pumping rinse water from each of said washing machines to said rinse water storage means and for pumping rinse water from said rinse water storage means to each of said washing machines, said pump means comprising a pump and valve assembly for each of said washing machines, each of said pump and valve assemblies comprising:
  (1) a first pipe means which is connected to said first branch conduit and to said second conduit means;
  (2) a second pipe means which is connected to said second branch conduit and to said second conduit means;
  (3) a third pipe means which is connected to said first pipe means and to said second pipe means;
  (4) a pump which is operatively connected to said third pipe means for pumping rinse water from said second pipe means to said first pipe means;
  (5) a first valve which is operatively connected to said first and third pipe means, said first valve having a first position wherein rinse water flows from said water storage tank to said third pipe means, said first valve having a second position wherein rinse water flows from the respective washing machine to said third pipe means; and
  (6) a second valve which is operatively connected to said second and third pipe means, said second valve having a first position wherein rinse water flows from said third pipe means toward the respective washing machine, said second valve having a second position wherein rinse water from said third pipe means flows toward said water storage tank, whereby when both of said first and second valves are in their first positions, water is pumped from said water storage tank to the respective washing machine and when both of said first and second valves are in their second positions, rinse water is pumped from the respective washing machine to said storage tank;

(e) discharge means which is operatively connected to each of said washing machines for selectively discharging water from the at least one rinse cycle of each of said washing machines into said second conduit means and for selectively discharging water from the at least one wash cycle of each of said washing machines into a waste water system; and (f) control means for coordinating the at least one wash and at least one rinse cycle of each of said washing machines with said pump means, said discharge means and said fresh water supply inlet mechanism so that for each of said washing machines, rinse water is pumped into the washing machine from said rinse water storage means for the at least one wash cycle, water from the at least one wash cycle is discharged into a waste water system, fresh water from the fresh water supply inlet mechanism is introduced into the washing machine for the at least one rinse cycle, and water is discharged from the washing machine at the end of the at least one rinse cycle and pumped to said rinse water storage means.

8. An energy and water conservation laundry mechanism as recited in claim 7, wherein each of said first and second valve is a three way valve.

9. An energy and water conservation laundry system as recited in claim 7, further comprising, for each of said washing machines, a filter which is operatively connected to said third pipe means so that rinse water which is pumped toward and away from the washing machine flows through said filter.

* * * * *